Patented Dec. 15, 1936

2,064,580

UNITED STATES PATENT OFFICE 2,064,580

PLASTICIZING RUBBER

Ira Williams, Woodstown, and Carroll Cummings Smith, Carneys Point, N. J., assignors to E. I. du Pont de Nemours & Company, Wilmington, Del., a corporation of Delaware No Drawing. Application February 11, 1936, Serial No. 63,394

27 Claims. (Cl. 134—17)

This invention relates to rubber and more especially to methods of treating rubber to produce a more plastic product.

It is well known that rubber, when subjected to mechanical working such as is obtained by the use of a rubber mill and especially in the presence of oxygen, is rendered much more plastic. The degree of plasticizing is determined to a great extent by the temperature and time of milling. When milled for a sufficient length of time, rubber will become very soft and at the same time will lose much of its ability to vulcanize. In order to reduce the time of milling and to prevent the deteriorating action of continued milling, it is common practice to add to the rubber, during the milling operation, certain materials which assist in producing softness.

The materials which are commonly used are oils, esters, waxes, fats, alcohols, acids, resins, etc., which assist the production of soft rubber either by a swelling action on the rubber or by acting as a lubricant. Some of the more common softeners are mineral oil, pine tar, palm oil, rosin oil, dibutyl phthalate, paraffin, glycerine, lauryl alcohol and stearic acid. It is also known that certain chemicals, such as diphenyl guanidine, have a slight softening action on the rubber while other products, such as benzidine, have a considerable stiffening action.

The use of substituted hydrazines and their salts as softeners for rubber has been disclosed in U. S. Patents 2,018,643, 4 and 5 (1935). The use of this type of material permits rubber to be plasticized without the addition of harmful swelling agents, such as oils, which continue to affect the physical properties of the rubber after vulcanization.

An object of the present invention is to provide a new class of materials which are efficient plasticizing agents and which are, in general, less toxic than the substituted hydrazines. Another object is to provide a method of plasticizing rubber. A further object is to provide a method for producing rubber cements of increased rubber content and reduced viscosity. Still further objects are to provide rubber of increased plasticity and rubber cements of increased rubber content and reduced viscosity. Still other objects are to provide new compositions of matter and to advance the art.

These objects may be accomplished in accordance with our invention which comprises subjecting unvulcanized rubber to the action of an aromatic mercaptan or thio-phenol in the absence of more than about 3.5% of sulphur and for a sufficient length of time for said mercaptan to effect a marked decrease in the resistance of the rubber to flow over that which the rubber would have if subjected to the same conditions in the absence of said mercaptan. Preferably, the aromatic mercaptan is one which is devoid of oxygen containing inorganic acid groups. Of these compounds, the most effective are the aromatic mercaptans in which the aromatic radical consists of carbon and hydrogen which compounds may be represented by the formula R—SH in which R represents an aryl radical such as phenyl, tolyl, biphenyl, naphthyl, methyl naphthyl, or a higher aromatic nucleus in which the sole substituents consist of carbon and hydrogen such as alkyl and aralkyl radicals.

The phrases "an aromatic mercaptan" and "a thio-phenol", as employed herein and in the claims, are coextensive in scope and are restricted to aromatic compounds containing a sulfhydryl (—SH) radical in which the sulfur is bonded directly to a carbon atom in the aromatic ring. In other words, they are phenols in which a phenolic oxygen has been replaced by a sulfur atom.

Rubber, in order to become plasticized, must be subjected to a suitable chemical attack by oxygen. A suitable type of oxidation is obtained by the usual process of milling by other mechanical processes such as creping or by exposure of the rubber, while in a swollen condition, to the action of oxygen or air. The use of the aromatic mercaptans of our invention permit the rubber to be plasticized with a minimum attack by oxygen. In certain cases, such as smoked sheet rubber, sufficient oxidation has taken place during the process of milling and forming the sheet to permit very considerable plasticizing under the influence of our compounds. In other cases, such as fine para rubber, little softening action is produced before the rubber has been subjected to a small amount of milling either directly or during a washing operation.

After the rubber is treated with the aromatic mercaptan, the plasticity develops at a speed which depends upon the amount of reagent employed and upon the temperature. While some softening will take place during the period of incorporation, it is usually necessary to hold the rubber for a period of time at an elevated temperature in order for the full benefit of our invention to be obtained.

In order to more clearly illustrate our invention, the preferred modes of carrying the same into effect and the advantageous results to be obtained thereby, the following examples are given:

Example 1

1500 grams of smoked sheet rubber were placed on an 18-inch laboratory mill heated to 100° C. After two minutes, 3.75 grams of either thio-alpha-naphthol or thio-beta-naphthol was added and the milling was continued for three minutes. A control stock to which no thio-naphthol was added was milled for five minutes. Each stock was held for various periods of time at several temperatures. The plasticity changes were followed by means of a parallel plate plastometer, which measured the thickness in inches of a 2 ccm. pellet of rubber, after being in the plastometer for five minutes at 70° C. The results are shown in Table I.

Table I

| Conditions of storage | Plasticity of rubber treated with— | | |
|---|---|---|---|
| | Thio-a-naphthol | Thio-b-naphthol | Control |
| Immediately after milling | .147 | .159 | .200 |
| 24 hrs. at 30° C | .138 | .143 | .200 |
| 4 hrs. at 70° C | .147 | .152 | .195 |
| 20 hrs. at 70° C | .141 | .135 | .200 |
| 44 hrs. at 70° C | .120 | .132 | .190 |
| 1 hr. at 100° C | .141 | .138 | .185 |
| 3 hrs. at 100° C | .097 | .115 | .188 |
| 0.5 hrs. at 130° C | .147 | .155 | .210 |
| 1 hr. at 130° C | .120 | .120 | .170 |

Example 2

1500 grams of smoked sheet rubber were placed on an 18-inch laboratory mill heated to 70° C. After five minutes the plasticizing agent consisting of either thio-alpha-naphthol, thio-beta-naphthol, the lead salt of thio-beta-naphthol or the dibutyl amine salt of thio-beta-naphthol was added and the milling was continued for five minutes. A control stock was milled for ten minutes. The rubber was then held for various times at different temperatures and the plasticity changes were followed as in Example 1. The results are shown in Table II.

Table II

| Conditions of storage | Plasticity of rubber treated with— | | | | |
|---|---|---|---|---|---|
| | 0.15% thio-a-naphthol | 0.15% thio-b-naphthol | 0.5% lead salt of thio-b-naphthol | 0.5% dibutyl amine salt of thio-b-naphthol | Control |
| Immediately after milling | .143 | .143 | .138 | .147 | .168 |
| 24 hrs. at 25° C | .141 | .143 | .147 | .152 | .175 |
| 24 hrs. at 70° C | .135 | .143 | .138 | .155 | .180 |
| 5 hrs. at 100° C | .115 | .115 | .125 | .138 | .172 |

It will be noted that the salts of the mercaptans had but little effect on the plasticity of the rubber at 25 and 70° C. However, at 100° C., these salts were very effective plasticizers. This may be explained by the fact that the rubber contained, as is usual, natural acids. At the temperature of 100° C., these acids were apparently rendered sufficiently active to react with the salts to release free mercaptan which thereupon exercised its plasticizing effect.

Example 3

A rubber cement was prepared by dissolving 80 grams of lightly milled smoked sheets in 1000 grams of benzene. The cement was divided and different portions were treated with 1% of different aromatic mercaptans based on the weight of rubber. The viscosity was then measured after 5 hours by determining the time required for a ⅛ inch steel ball to fall through a 5 inch column of cement. The results are shown in Table III.

Table III.—Viscosity of treated rubber cements

| Material added | Viscosity in seconds |
|---|---|
| Control | 400 |
| Thiophenol | 2 |
| Thio-o-cresol | 18 |
| Mono-thio-catechol | 52 |
| Dithio-resorcinol | 120 |
| Thio-a-naphthol | 5 |
| Thio-b-naphthol | 5 |
| Thio-salicylic acid | 167 |

Similar results are obtained when other solvents such as gasoline or gasoline containing small amounts of alcohol are used.

The method of employing this class of softening agents may be varied to suit the conditions. In some cases it may be desirable to treat the surface of the rubber and permit the softening agent to diffuse into the rubber. In other cases sufficient softening agent may be used and a sufficiently long milling period may be employed to produce a marked softening of the rubber before any period of storage. In other cases it may be found desirable to incorporate certain compounding ingredients at the time the aromatic mercaptan is added. It has, however, been found that the presence of sulphur in excess of about 3.5% is sufficient to very seriously interfere with the softening process and should be avoided.

It appears that the salts of the mercaptans, in other words, the mercaptides, have little or no effect on the plasticity of the rubber. Accordingly, when we speak of the mercaptans or the thio-phenols and their effect on the rubber in our specification and claims, we refer to the free mercaptan or thio-phenol as distinguished from its salts. This necessarily requires the absence of basic or other neutralizing materials during the plasticizing period.

Advantage of the relative inactivity of the salts of the mercaptans may be availed of to control the softening action and for other purposes. For example, the rubber may be subjected to the action of the mercaptan until a certain desired degree of plasticity or viscosity is obtained and then a neutralizing agent may be added to prevent or retard further action of the mercaptan. Also, some of the mercaptans, such as thiophenol have an odor which to certain people is somewhat unpleasant. This objection may be overcome by neutralizing the mercaptan by the addition of basic or neutralizing material to the rubber after the desired degree of plasticity has been obtained. Also, salts of the mercaptans may be added to the rubber or the mercaptans may be added to the rubber containing considerable quantities of neutralizing agents and, at any time thereafter, an acid material such as propionic, stearic or other acid may be added to liberate free mercaptan to plasticize the rubber. Thus, it is possible to control the time at which the plasticizing action is to take place and the degree of softening desired without it being necessary to carefully control the amount of mercaptan added to the rubber. Accordingly, when the mercaptan is referred to in the claims, we refer to the free compound whether it is added to the rubber as such or as a salt or other derivative and subsequently liberated in the free state by means of acid and the like.

Rubber cements of increased rubber content and decreased viscosity may be prepared by dissolving the rubber in any suitable solvent such as benzene, gasoline, carbon tetrachloride, ethylene dichloride and the like and treating the solution with an aromatic mercaptan or a mixture thereof. The mercaptan will thereupon act to greatly reduce the viscosity of the cement as shown in Example 3. It will generally be preferable to either treat the rubber with the mercaptan to develop a soft product before dissolving the rubber in the solvent or to add the mercaptan to the solvent before dissolving the rubber therein. By these last two methods, it will be found that solution of the rubber in the solvent will be greatly expedited and large amounts of rubber may be incorporated in the solvent to produce a cement of any specified viscosity.

The above examples illustrate the results to be obtained with some of the compounds of our invention. Other aromatic mercaptans which have been found to be valuable plasticizers of rubber are: m-chlor-thiophenol, p-phenyl-thiophenol, stearyl ring substituted thiophenol, p-mercapto-diphenyl-methane, 2:3-dimercapto-naphthalene, 2-mercapto-anthracene.

Other suitable mercaptans will be readily apparent to those skilled in the art.

The mercaptans of our invention, and particularly thio alpha naphthol, are, in general, about as effective as phenyl hydrazine in plasticizing rubber but are, in general, less toxic than the hydrazines. Also, our mercaptans are in general, more effective than the hydrazines when employed in gasoline and like cements.

By the phrase "decreasing the resistance of the rubber to flow" we mean to include decrease in viscosity of rubber solutions as well as increase in plasticity of ordinary unvulcanized rubber in the more or less solid state.

While we have disclosed the preferred embodiments of our invention, it will be readily apparent to those skilled in the art that many changes and variations may be made therein without departing from the spirit of our invention. Accordingly, the scope of our invention is to be limited solely by the appended claims construed as broadly as is permissible in view of the prior art.

We claim:

1. The method of decreasing the resistance to flow of unvulcanized rubber which comprises subjecting the unvulcanized rubber to the action of a thio-phenol in the absence of more than about 3.5% of sulfur and in the absence of sufficient amount of a basic neutralizing material to neutralize the thio-phenol and for a sufficient length of time for said thio-phenol to effect a marked decrease in the resistance of the rubber to flow over that which the rubber would have if subjected to the same conditions in the absence of said thio-phenol.

2. The method of decreasing the resistance to flow of unvulcanized rubber which comprises subjecting the unvulcanized rubber to the action of a thio-phenol devoid of oxygen containing inorganic acid groups in the absence of more than about 3.5% of sulfur and in the absence of sufficient amount of a basic neutralizing material to neutralize the thio-phenol and for a sufficient length of time for said thio-phenol to effect a marked decrease in the resistance of the rubber to flow over that which the rubber would have if subjected to the same conditions in the absence of said thio-phenol.

3. The method of decreasing the resistance to flow of unvulcanized rubber which comprises subjecting the unvulcanized rubber to the action of a thio-phenol in which the aromatic radical is devoid of non-hydrocarbon substituents other than hydroxyl in the absence of more than about 3.5% of sulfur and in the absence of sufficient amount of a basic neutralizing material to neutralize the thio-phenol and for a sufficient length of time for said thio-phenol to effect a marked decrease in the resistance of the rubber to flow over that which the rubber would have if subjected to the same conditions in the absence of said thio-phenol.

4. The method of decreasing the resistance to flow of unvulcanized rubber which comprises subjecting the unvulcanized rubber to the action of a thio-phenol in which the aromatic radical consists of carbon and hydrogen in the absence of more than about 3.5% of sulfur and in the absence of sufficient amount of a basic neutralizing material to neutralize the thio-phenol and for a sufficient length of time for said thio-phenol to effect a marked decrease in the resistance of the rubber to flow over that which the rubber would have if subjected to the same conditions in the absence of said thio-phenol.

5. The method of decreasing the resistance to flow of unvulcanized rubber which comprises subjecting the unvulcanized rubber to the action of a thio-phenol in which the aromatic radical contains at the most 2 benzene rings and is devoid of non-hydrocarbon substituents other than hydroxyl in the absence of more than about 3.5% of sulfur and in the absence of sufficient amount of a basic neutralizing material to neutralize the thio-phenol and for a sufficient length of time for said thio-phenol to effect a marked decrease in the resistance of the rubber to flow over that which the rubber would have if subjected to the same conditions in the absence of said thio-phenol.

6. The method of decreasing the resistance to flow of unvulcanized rubber which comprises subjecting the unvulcanized rubber to the action of a thio-phenol in which the aromatic radical contains at the most 2 benzene rings and consists of carbon and hydrogen in the absence of more than about 3.5% of sulfur and in the absence of sufficient amount of a basic neutralizing material to neutralize the thio-phenol and for a sufficient length of time for said thio-phenol to effect a marked decrease in the resistance of the rubber to flow over that which the rubber would have if subjected to the same conditions in the absence of said thio-phenol.

7. The method of decreasing the resistance to flow of unvulcanized rubber which comprises subjecting the unvulcanized rubber to the action of a thio naphthol in the absence of more than about 3.5% of sulfur and in the absence of sufficient amount of a basic neutralizing material to neutralize the thio-naphthol and for a sufficient length of time for said thio-naphthol to effect a marked decrease in the resistance of the rubber to flow over that which the rubber would have if subjected to the same conditions in the absence of said thio-naphthol.

8. The method of decreasing the resistance to flow of unvulcanized rubber which comprises subjecting the unvulcanized rubber to the action of thio-alpha-naphthol in the absence of more than about 3.5% of sulfur and in the absence of sufficient amount of a basic neutralizing material to neutralize the thio-naphthol and for a sufficient length of time for said thio-alpha-naphthol to effect a marked decrease in the resistance of the rubber to flow over that which the rubber would have if subjected to the same conditions in the absence of said thio-alpha-naphthol.

9. The method of decreasing the resistance to flow of unvulcanized rubber which comprises subjecting the unvulcanized rubber to the action of a thio-phenol in the absence of sulfur and in the absence of sufficient amount of a basic neutralizing material to neutralize the thio-phenol and for a sufficient length of time for said thio-phenol to effect a marked decrease in the resistance of the rubber to flow over that which the rubber would have if subjected to the same conditions in the absence of said thio-phenol.

10. The method of decreasing the resistance to flow of unvulcanized rubber which comprises subjecting the unvulcanized rubber to the action of a thio-phenol devoid of oxygen containing inorganic acid groups in the absence of sulfur and in the absence of sufficient amount of a basic neutralizing material to neutralize the thio-phenol and for a sufficient length of time for said thio-phenol to effect a marked decrease in the resistance of the rubber to flow over that which the rubber would have if subjected to the same conditions in the absence of said thio-phenol.

11. The method of decreasing the resistance to flow of unvulcanized rubber which comprises subjecting the unvulcanized rubber to the action of a thio-phenol prior to the addition of compounding ingredients and in the absence of sufficient amount of a basic neutralizing material to neutralize the thio-phenol and for a sufficient length of time for said thio-phenol to effect a marked decrease in the resistance of the rubber to flow over that which the rubber would have if subjected to the same conditions in the absence of said thio-phenol.

12. The method of decreasing the resistance to flow of unvulcanized rubber which comprises subjecting the unvulcanized rubber to the action of a thio-phenol devoid of oxygen containing inorganic acid groups prior to the addition of compounding ingredients and in the absence of sufficient amount of a basic neutralizing material to neutralize the thio-phenol and for a sufficient length of time for said thio-phenol to effect a marked decrease in the resistance of the rubber to flow over that which the rubber would have if subjected to the same conditions in the absence of said thio-phenol.

13. The method of reducing the viscosity of solutions of unvulcanized rubber which comprises incorporating in the solution a small amount of a thio-phenol in the absence of more than about 3.5% of sulfur and in the absence of sufficient amount of a basic neutralizing material to neutralize the thio-phenol and maintaining the thio-phenol in contact with the rubber for a sufficient length of time for the thio-phenol to effect a marked decrease in the resistance of the rubber to flow.

14. The method of reducing the viscosity of solutions of unvulcanized rubber which comprises incorporating a thio-phenol in the rubber prior to dissolving the rubber in the solvent and maintaining the thio-phenol in contact with the rubber in the absence of more than about 3.5% of sulfur and in the absence of sufficient amount of a basic neutralizing material to neutralize the thio-phenol until the thio-phenol has effected a marked decrease in the resistance of the rubber to flow.

15. The method of reducing the viscosity of solutions of unvulcanized rubber which comprises dissolving the rubber in a solvent containing a small amount of a thio-phenol, in the absence of more than about 3.5% of sulfur and in the absence of sufficient amount of a basic neutralizing material to neutralize the thio-phenol.

16. Rubber obtainable by the method of claim 1.
17. Rubber obtainable by the method of claim 9.
18. Rubber obtainable by the method of claim 11.
19. Solutions of rubber obtainable by the method of claim 13.

20. The method of decreasing the resistance to flow of unvulcanized rubber which comprises subjecting the unvulcanized rubber to the action of a thio-phenol in which the aromatic radical consists of carbon and hydrogen in the absence of sulfur and in the absence of sufficient amount of a basic neutralizing material to neutralize the thio-phenol and for a sufficient length of time for said thio-phenol to effect a marked decrease in the resistance of the rubber to flow over that which the rubber would have if subjected to the same conditions in the absence of said thio-phenol.

21. The method of decreasing the resistance to flow of unvulcanized rubber which comprises subjecting the unvulcanized rubber to the action of thio-alpha-naphthol in the absence of sulfur and in the absence of sufficient amount of a basic neutralizing material to neutralize the thio-alpha-naphthol and for a sufficient length of time for said thio-alpha-naphthol to effect a marked decrease in the resistance of the rubber to flow over that which the rubber would have if subjected to the same conditions in the absence of said thio-alpha-naphthol.

22. The method of decreasing the resistance to flow of unvulcanized rubber which comprises subjecting the unvulcanized rubber to the action of thio-beta-naphthol in the absence of sulfur and in the absence of sufficient amount of a basic neutralizing material to neutralize the thio-beta-naphthol and for a sufficient length of time for said thio-beta-naphthol to effect a marked decrease in the resistance of the rubber to flow over that which the rubber would have if subjected to the same conditions in the absence of said thio-beta-naphthol.

23. The method of decreasing the resistance to flow of unvulcanized rubber which comprises subjecting the unvulcanized rubber to the action of an unsubstituted thio-cresol in the absence of sulfur and in the absence of sufficient amount of a basic neutralizing material to neutralize the thio-cresol and for a sufficient length of time for said thio-cresol to effect a marked decrease in the resistance of the rubber to flow over that which the rubber would have if subjected to the same conditions in the absence of said thio-cresol.

24. The method of decreasing the resistance to flow of unvulcanized rubber which comprises subjecting the unvulcanized rubber to the action of a thio-phenol in which the aromatic radical consists of carbon and hydrogen prior to the addition of compounding ingredients and in the absence of sufficient amount of a basic neutralizing material to neutralize the thio-phenol and for a sufficient length of time for said thio-phenol to effect a marked decrease in the resistance of the rubber to flow over that which the rubber would have if subjected to the same conditions in the absence of said thio-phenol.

25. The method of reducing the viscosity of solutions of unvulcanized rubber which comprises incorporating in the solution a small amount of a thio-phenol in which the aromatic radical consists of carbon and hydrogen in the absence of more than about 3.5% of sulfur and in the absence of sufficient amount of a basic neutralizing material to neutralize the thio-phenol and maintaining the thio-phenol in contact with the rubber for a sufficient length of time for the thio-phenol to effect a marked decrease in the resistance of the rubber to flow.

26. The method of decreasing the resistance to flow of unvulcanized rubber which comprises subjecting the unvulcanized rubber to the action of thio-beta-naphthol in the absence of more than about 3.5% of sulfur and in the absence of sufficient amount of basic neutralizing material to neutralize the thio-beta-naphthol and for a sufficient length of time for said thio-beta-naphthol to effect a marked decrease in the resistance of the rubber to flow over that which the rubber would have if subjected to the same conditions in the absence of said thio-beta-naphthol.

27. The method of decreasing the resistance to flow of unvulcanized rubber which comprises subjecting the unvulcanized rubber to the action of an unsubstituted thio-cresol in the absence of more than about 3.5% of sulfur and in the absence of sufficient amount of basic neutralizing material to neutralize the thio-cresol and for a sufficient length of time for said thio-cresol to effect a marked decrease in the resistance of the rubber to flow over that which the rubber would have if subjected to the same conditions in the absence of said thio-cresol.

IRA WILLIAMS.
CARROLL CUMMINGS SMITH.